Oct. 7, 1969 G. D. FRYMIRE 3,470,764
LEVER OPERATOR ASSEMBLY
Filed Sept. 14, 1967

INVENTOR
GAROLD D. FRYMIRE
BY
*Lyon & Lyon*
ATTORNEYS

# United States Patent Office 3,470,764
Patented Oct. 7, 1969

3,470,764
LEVER OPERATOR ASSEMBLY
Garold D. Frymire, Santa Maria, Calif., assignor to Parlyn, Inc., a corporation of California
Filed Sept. 14, 1967, Ser. No. 667,761
Int. Cl. G05g 5/06; E06b 7/08
U.S. Cl. 74—528     3 Claims

ABSTRACT OF THE DISCLOSURE

A manual operator for a jalousie or venetian blind in which a pivoted combination handle member is used to obtain an adjustment and to secure such adjustment when made. The handle member is threaded on a stud bolt which extends through an arcuate slotted portion of a stationary housing and is attached to an actuating lever. This lever is loosely pivoted on the housing with sufficient radial play such that a portion of the lever is moved against such slotted portion when the handle member is turned on the stud bolt so that cooperating mating portions on the lever and slotted portion engage to positively lock the adjustment.

---

The present invention relates to improvements in operators useful in the opening and closing of hinged devices and has particular usefulness as an operator for a jalousie or venetian blind which, in accordance with certain features of the present invention, may be moved from fully open to fully closed positions and may be positively locked in such positions or any position between such fully open and fully closed positions.

The arrangement described herein is an improvement in the operator described and claimed in U.S. Patent 3,308,679 assigned to the present assignee.

It is therefore a general object of the present invention to provide an improved jalousie operator having positive locking means.

A specific object of the present invention is to provide an operator of this character in which the manually operating member has dual functions, namely of obtaining an adjustment and of securing such adjustment by bringing into engagement cooperating mating portions of a lever and the housing.

Another specific object of the present invention is to provide an operator of this character which is relatively simple, reliable, small, rugged, of relatively light weight, easy to operate and capable of relative inexpensive manufacture with mass production techniques, particularly when one considers the functions accomplished by the operator and the positive locking obtained.

The features of the present invention which are believed to be novel are set forth with particularity in the appended claims. This invention itself, both as to its organization and manner of operation, together with further objects and advantatges thereof, may be best understood by reference to the following description taken in connection with the accompanying drawings in which:

Figure 1:
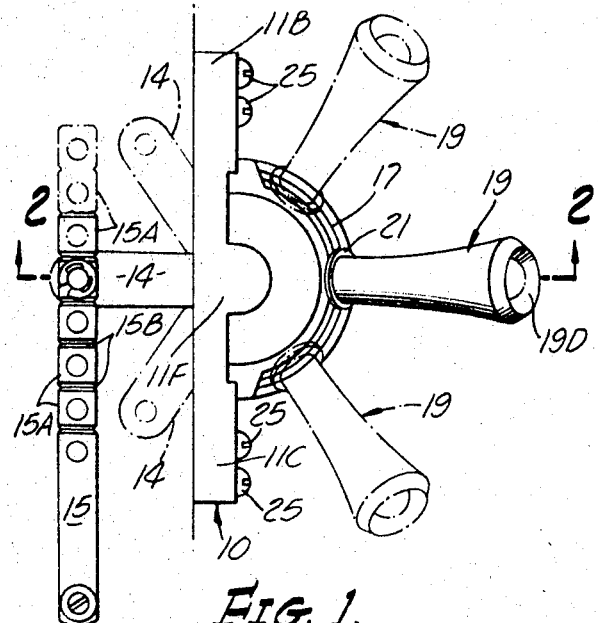
FIG. 1 is a top plan view of an operator embodying features of the present invention and includes dotted lines indicating extreme movements of travel of some elements thereof.

Referring to the drawings, the operator illustrated includes a housing 10 formed in a special manner from two die-cast parts 11, 12 which are riveted or staked or otherwise suitably secured together to form the composite housing 10 within which a lever 14 is loosely pivotally mounted.

The lever 14 at one of its ends has one end of a link 15 pivotally attached thereto, the other end of the link 15 being adapted for connection to the movable portion of a jalousie structure (not shown) for moving and positioning the same. For this purpose the link 15 is provided with a plurality of apertured portions 15A one of which is selected depending upon the desired length of link 15. The apertured portions 15A are connected by weakened sections 15B to facilitate the breaking off of lengths found undesirable upon installation. Also, the lever 14 is formed with a blind cylindrical hole 14A, the axis of which is offset with respect to the plane in which the lever 14 pivots, and fitted within such hole 14A is one end of a stud bolt, 16, the bolt 16 being secured within the lever hole 14A by a pin 14B.

This stud bolt 16 passes through an arcuate slotted portion 17 defined by oppositely disposed curved flange portions 11A, 12A of housing parts 11 and 12, respectively, and engages a threaded portion 19A extending axially within handle member 19. A metal washer 21 is retained loosely on bolt 16 between the inner end of handle member 19 and the outer surface of the flanged portions 11A, 12A.

A stop washer 23 retained by screw 24 threaded in the outer end of stud bolt 16 cooperates with an inner wall portion 19B of member 19 to limit the extent of rotation of the handle member 19 on stud bolt 16. This wall portion 19B defines the end of a cylindrical opening 19C which may be closed by a plug 19D press-fitted into the opening 19C after the screw 24 is tightened to retain the stop washer 23.

Figure 3:
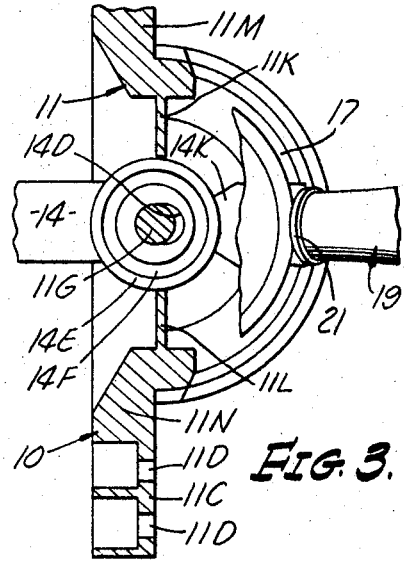
FIG. 3 is a view taken as indicated by line 3—3 in FIG. 2.

The housing part 11, referred to as the front housing, is formed with two outer hollow, generally rectangular base portions 11B, 11C which are aperturated, as indicated at 11D in FIG. 3, for passage of fastening elements 25 (FIG. 1) that serve to stationarily fasten the operator assembly on an apertured flat stationary support (not shown) through which the lever 14 extends as is generally conventional in the mounting of jalousie operators.

Figure 2:
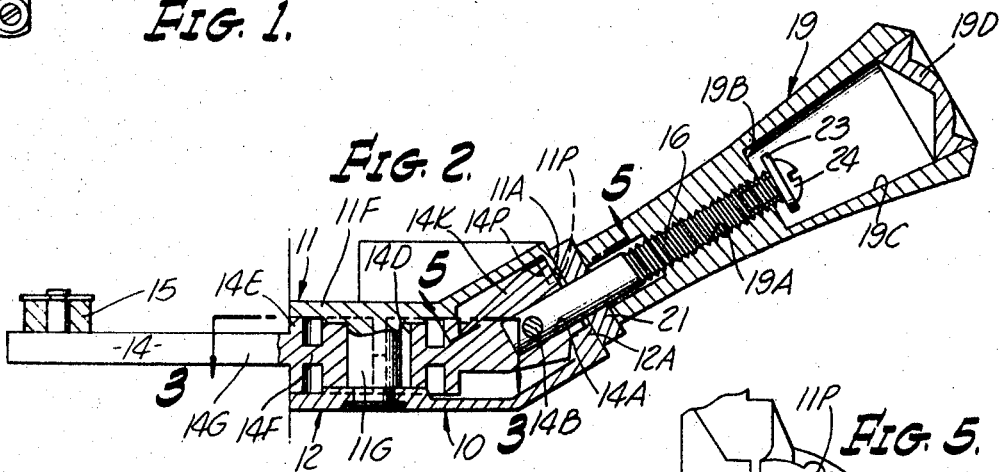
FIG. 2 is a sectional view taken substantially as indicated by the corresponding lines 2—2 in FIG. 1.
Figure 5:
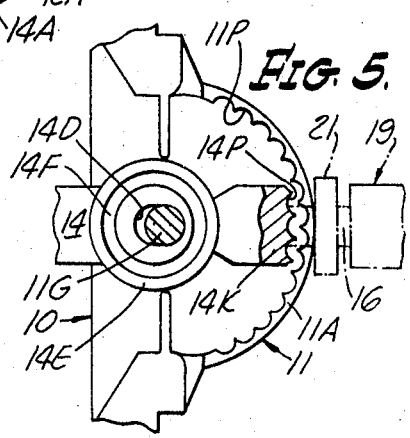
FIG. 5 is a view taken as indicated by line 5—5 in FIG. 2.

These outer portions 11B, 11C are integrally formed with an interconnecting intermediates front wall portion 11F and also with the centrally disposed angularly offset arcuate flanged portion 11A. Extending from this wall portion is a cylindrical post 11G (FIGS. 2, 3 and 5) which extends into a lost motion slotted portion 14D of lever 14. The width of this slotted portion 14D is slightly larger than the diameter of post 11G to allow a sliding fit but this slotted portion is elongated in the direction of the axis of stud bolt 16 to accomplish an important purpose as described later.

Thet lever 14 may be constructed in part as a portion of a dust trap. This apertured portion 14D is within an outer ring portion 14E and is joined thereto by a centrally disposed annular web portion 14F, with the lever arm 14G and stud bolt support portion 14K in the form of a block extending from diametrically opposite regions of the ring portion 14E. This block 14K at extreme movements of pivotal movement engages with web portions 12C, 12D (and like aligned web portions 11K, 11L) all serving as stop members and dust baffles.

Figure 4:
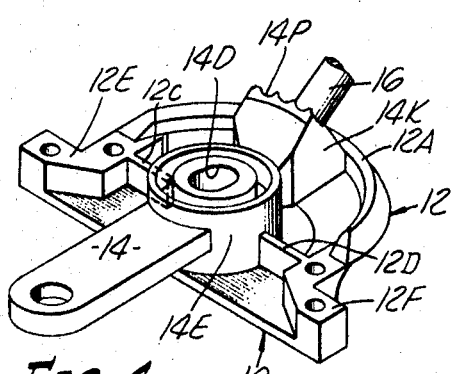
FIG. 4 is a perspective view of a portion of the operator.

The two housing parts 11, 12 are secured together at the abutting faces of their raised abutments 11M, 11N, 12E, 12F (FIGS. 3 and 4) using suitable securing means such as, for example, by riveting or staking.

An important feature of this construction together with the lost motion slot 14D is the provision of a series of notched portions 14P on the stud bolt support 14K cooperable with a like series of internal notched portions 11P on upper housing half 11 so that the handle 16 may be positively locked with respect to the stationary casing comprising housing halves 11, 12.

In operation, when an adjustment is desired, the handle member 19 is first turned about its axis on the stud bolt 16 so that the notched portions 14P, 11P may be disengaged by then shoving the handle member 19 inwardly, such inward movement of member 19 being permitted due to the provision of lost motion slot 14D. The lever 14 may then be turned about the axis of its pivot post 11G by applying force to the handle member 19 to cause the stud bolt to move within the arcuate grooved portion defined by spaced portions of housing halves 11, 12. After the adjustment is made, the handle member 19 is turned about its axis to again cause the notched portions 14P to engage the mating notched portions 11P, whereby the adjustment is secured.

While the particular embodiments of the present invention have been shown and described, it will be obvious to those skilled in the art that changes and modifications may be made without departing from this invention in its broader aspect.

I claim:

1. A jalousie operator structure, including a housing; said housing having an internal arcuate open slot defined by said housing; a lever structure loosely pivoted in said housing and having a portion thereof movable in said internal arcuate channel; a threaded stud extending from said portion and through said arcuate open slot; means pivoting said lever structure in said housing such that it may not only pivot in but also slide in said housing in a direction coextensive with the axis of said stud; cooperating notched portions on said lever structure and said housing; and a handle member threaded on said stud for moving said cooperating notched portions in locking engagement.

2. A jalousie structure as set forth in claim 1 in which the axis of said stud is included with respect to the pivotal axis of said lever structure.

3. In a jalousie operator structure, a housing structure; a lever structure; said lever structure including a threaded stud attached thereto; means loosely pivoting said lever structure in said housing structure such that said lever structure may not only pivot in but also move in said housing structure in a direction coextensive with the axis of said stud; cooperating locking means between said lever structure and said housing structure; and a single hand operated means on said stud and engageable with said housing structure for moving said locking means together upon turning of said member on said stud while said means engages said housing structure.

References Cited
UNITED STATES PATENTS

| | | | |
|---|---|---|---|
| 1,533,155 | 4/1925 | Zitterbart | 74—528 X |
| 2,435,857 | 2/1948 | Werner | 74—528 |
| 2,630,310 | 3/1953 | Conner | 49—87 |

MILTON KAUFMAN, Primary Examiner

U.S. Cl. X.R.

49—87